United States Patent [19]
Arimilli et al.

[11] Patent Number: 5,608,878
[45] Date of Patent: Mar. 4, 1997

[54] DUAL LATENCY STATUS AND COHERENCY REPORTING FOR A MULTIPROCESSING SYSTEM

[75] Inventors: Ravi K. Arimilli, Round Rock; John M. Kaiser, Cedar Park; William K. Lewchuk; Michael S. Allen, both of Austin, all of Tex.

[73] Assignees: International Business Machines Corporation, Armonk, N.Y.; Motorola, Inc., Schaumburg, Ill.

[21] Appl. No.: 316,980

[22] Filed: Oct. 3, 1994

[51] Int. Cl.$^6$ ................................................ G06F 13/00
[52] U.S. Cl. ..................... 395/287; 395/468; 395/185.04
[58] Field of Search ................................. 395/468, 470, 395/182.21, 182.13, 185.02, 185.04, 473

[56] References Cited

U.S. PATENT DOCUMENTS

5,263,153  11/1993  Intrater et al. ........................ 395/575
5,313,627  4/1994  Armini ................................. 395/575
5,404,489  4/1995  Woods et al. ......................... 395/425
5,463,753  10/1995  Fry et al. ............................. 395/473
5,490,253  2/1996  Laha et al. ........................... 395/304

*Primary Examiner*—Jack B. Harvey
*Assistant Examiner*—David A. Wiley
*Attorney, Agent, or Firm*—Kelly K. Kordzik; Winstead Sechrest & Minick P.C.; Mark E. McBurney

[57] ABSTRACT

A multiprocessing system utilizes a bus protocol having two response windows. The first response window is at a fixed latency from the transmission of a bus request and/or address, while the second response window, utilized for coherency reporting, is placed a configurable number of clock cycles after the bus request and address to allow for longer access, or snoop, times to perform a cache directory look-up within other bus devices. The first response window reports error or flow control and error status. Furthermore, a method had been described, which implements the reporting of response information in a flexible and high performance manner.

20 Claims, 7 Drawing Sheets

DUAL LATENCY STATUS AND COHERENCY REPORTING FOR A MULTIPROCESSING SYSTEM

CROSS REFERENCE TO RELATED APPLICATIONS

This application for patent is related to the following applications for patent filed concurrently herewith:

EFFICIENT ADDRESS TRANSFER TECHNIQUE FOR A DATA PROCESSING SYSTEM, Ser. No. 08/317,007;

SYSTEM AND METHOD FOR DETERMINING SOURCE OF DATA IN A SYSTEM WITH INTERVENING CACHES, Ser. No. 08/317,256;

QUEUED ARBITRATION MECHANISM FOR DATA PROCESSING SYSTEM, Ser. No. 08/317,006;

METHOD AND APPARATUS FOR REMOTE RETRY IN A DATA PROCESSING SYSTEM, Ser. No. 08/316,978;

ARRAY CLOCKING METHOD AND APPARATUS FOR INPUT/OUTPUT SUBSYSTEMS, Ser. No. 08/316,976;

DATA PROCESSING SYSTEM HAVING DEMAND BASED WRITE THROUGH CACHE WITH ENFORCED ORDERING, Ser. No. 08/316,979;

COHERENCY AND SYNCHRONIZATION MECHANISMS FOR I/O CHANNEL CONTROLLERS IN A DATA PROCESSING SYSTEM, Ser. No. 08/316,977;

ALTERNATING DATA VALID CONTROL SIGNALS FOR HIGH PERFORMANCE DATA TRANSFER, Ser. No. 08/326,190;

LOW LATENCY ERROR REPORTING FOR HIGH PERFORMANCE BUS, Ser. No. 08/326,203.

Each of such cross-referenced applications are hereby incorporated by reference into this Application as though fully set forth herein.

TECHNICAL FIELD OF THE INVENTION

The present invention relates in general to data processing systems and, in particular, to a system and method for providing flow control and coherency information within a multiprocessor system.

BACKGROUND OF THE INVENTION

In a multiprocessor system, including a plurality of bus devices coupled to a memory system via a shared bus, a bus device will issue an operation, such as a read operation, requesting a particular portion of data stored within the memory system. In systems employing "snoopy" bus devices, each of the bus devices coupled to the shared bus will monitor the operation to determine whether or not a more recent (often modified) copy of the requested data is contained within that bus device's cache, thus making that modified copy of the requested data the most recent version. This is often referred to as coherency checking, wherein the system insures that the most recent and valid version of requested data is sent to the requesting device, regardless of whether or not the memory system or one of the bus devices currently holds a copy of the most recent version.

When a bus device sends a bus request over the shared bus, there are often several types of reports sent back to the requesting device. One report informs the requesting device of whether or not a "parity error" was detected by one of the bus devices, or whether or not the requested operation was not properly sampled or decoded by one of the bus devices. Another report informs the requesting device of whether or not the resources being requested are presently busy. Another piece of information sent back to the requesting bus device reports on the coherency of the requesting data, i.e., who owns a valid version of the requested data. A problem with these several pieces of information being sent at the same time is that often other bus devices require additional time to snoop their caches because of internal delays within a particular bus device. For example, a particular bus device desiring to perform a snooping operation may still possess a queue of operations that are to be performed previous to the snooping operation. If one or more bus devices incurs such a delay in performing a snooping operation with respect to a particular bus request, the efficiency and performance of the system becomes degraded.

It is often not necessary to wait for a particular bus device to perform a snoop operation, since it may be determined by the system controller that there is an error in the bus request or the intended receiver of the request is not connected to the shared bus or is unavailable, resulting in the request being discarded. Thus, in such instances, it would be desirous to have a technique for reporting such flow control related status information back to a bus device requesting an operation on the shared bus separate from reporting coherency related information so that valuable buffers or snoop bandwidth of other bus participants is not utilized if the flow control information results in a discarding of the bus request.

SUMMARY OF THE INVENTION

It is an object of the present invention to separate the reporting of flow control and error status information from the reporting of coherency information to a bus device within a multiprocessing system when such bus device has issued a bus request and/or address onto the shared bus coupling the bus devices with a memory system.

In an attainment of the above object, the present invention utilizes a bus protocol, which is a synchronous, clocked protocol with two response windows. The first response window is at a fixed latency from the transmission of the request code and address (if any). This first response window is placed, in a preferred embodiment, two clock cycles from the cycle containing the request code and address. This allows sufficient time to check for valid parity and decode the request and/or address and decide if there are facilities in a receiver to handle the request at that time. If there is an error in the request, or the receiver cannot perform the request at that time, the first response window is used to indicate this fact, so that the request may be discarded and not consume valuable buffers or snoop bandwidth of the other bus participants.

The second response window utilized within the bus protocol of the present invention is used for coherency reporting. This window is placed a configurable number of clock cycles after the address and request code to allow for different and longer access times to perform a cache directory look-up within each of the bus devices (a snoop operation).

There are generally two main types of transactions in a multiprocessor system, those that must be snooped (sampled by other bus devices) for memory coherency and those which do not need to be snooped. The separate windows allow for the non-coherent requests to complete on the bus as soon as possible without waiting for the coherency response window, which may have a necessarily longer latency, due to the cache directory look-ups required within each of the other bus devices.

It is another objective of the present invention to efficiently support a large number of processors and/or bus devices coupled to a shared bus and be capable of communicating response information in a timely manner.

In attainment of the aforementioned objective, a method has been provided for transmitting collecting and distributing the flow control, error status, and coherency information in a high performance manner.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

With the foregoing hardware in mind, it is possible to explain the process-related features of the present invention. To more clearly describe these features of the present invention, discussion of other conventional features is omitted as being apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Figure 1:
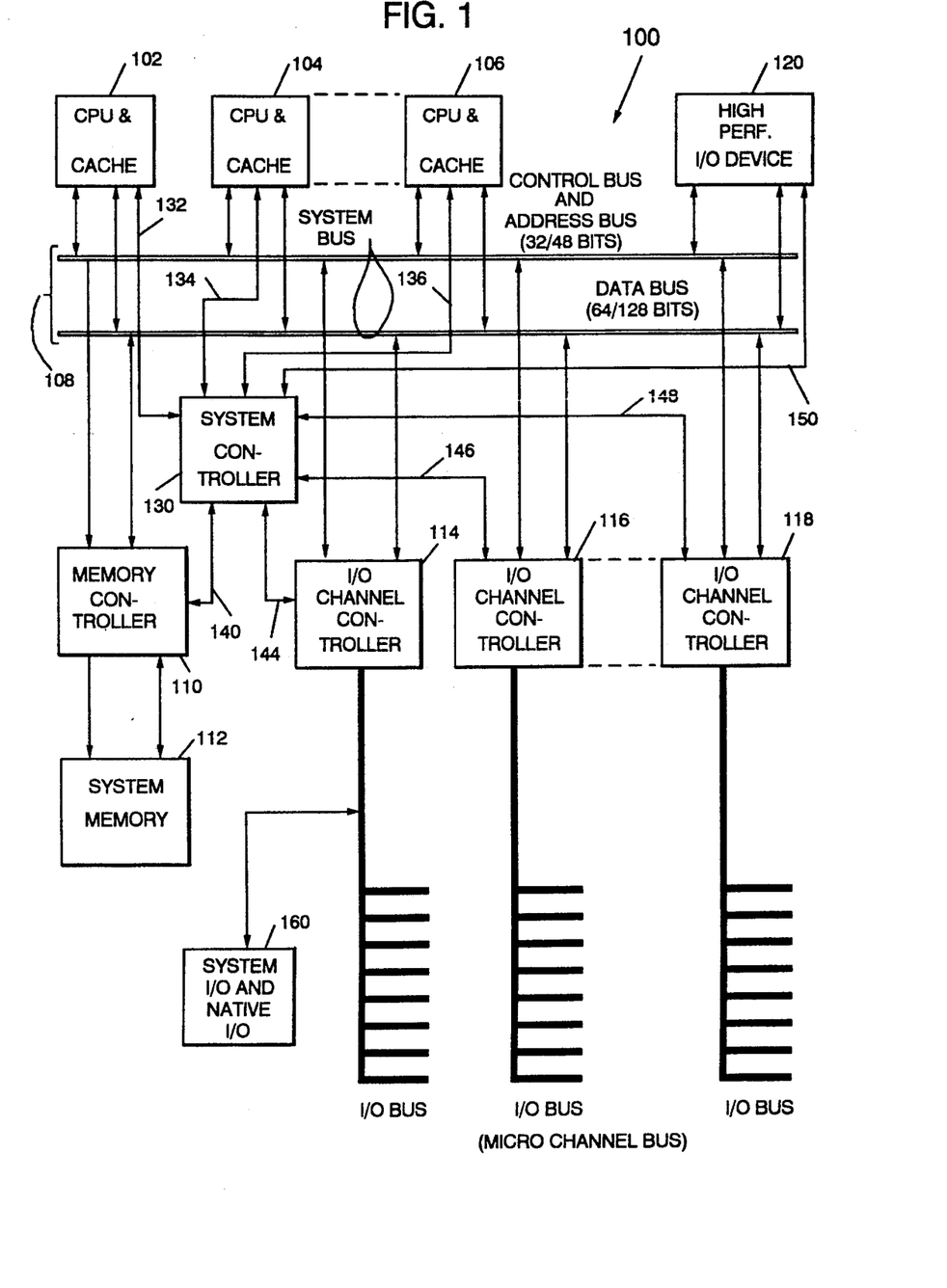
FIG. 1 illustrates a system block diagram in accordance with the present invention.

Referring now to FIG. 1, a data processing system which advantageously embodies the present invention will be described. Multiprocessor system 100 includes a number of processing units 102, 104, 106 operatively connected to a system bus 108. Also connected to the system bus 108 is a memory controller 110, which controls access to system memory 112, and I/O channel controllers 114, 116, and 118. Additionally, a high performance I/O device 120 may be connected to the system bus 108. Each of the system elements described 102–120, inclusive, operate under the control of system controller 130 which communicates with each unit connected to the system bus 108 by point to point lines such as 132 to processor 102, 134 to processor 104, 136 to processor 106, 140 to memory controller 110, 144 to I/O channel controller 114, 146 to I/O channel controller 116, 148 to I/O channel controller 118, and 150 to high performance I/O device 120. Requests and grants of bus access are all controlled by system controller 130.

I/O channel controller 114 controls and is connected to system I/O subsystem and native I/O subsystem 160.

Each processor unit 102, 104, 106 may include a processor and a cache storage device.

Figure 2:
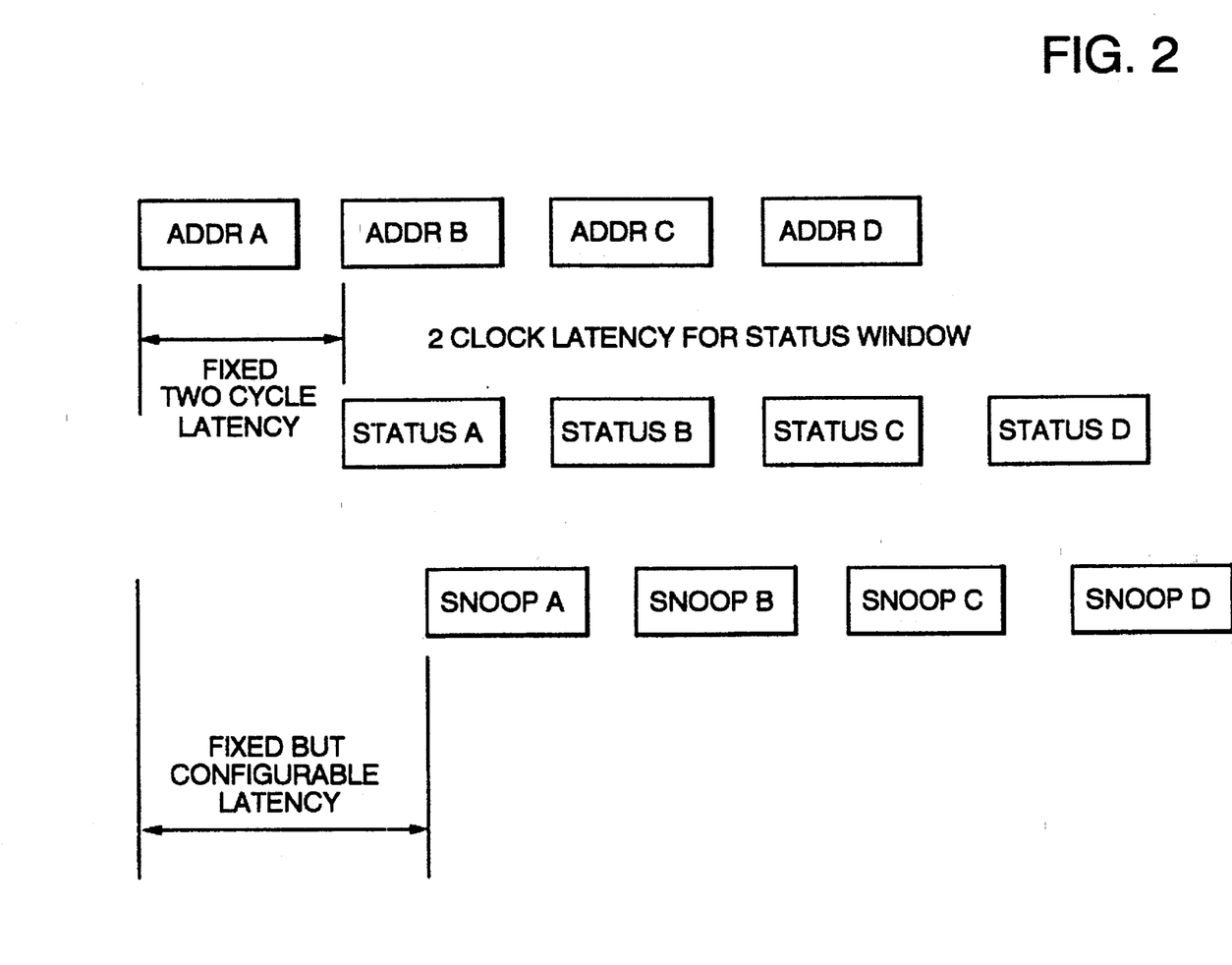
FIG. 2 illustrates a timing diagram in accordance with the present invention.

One of the bus devices, such as processor 102, may request to enable an operation onto bus 108 from system controller 130 via connection 132. Upon receiving a bus grant from system controller 130, processor 102 will then enable an address onto bus 108. Referring next to FIG. 2, address A may be enabled onto bus 108 by processor 102. A fixed time later, status information, i.e., flow control and error status, will be returned to processor 102. If such status information indicates to processor 102 that there is an address parity error, or a busy condition in the addressed device, or that the resource addressed by address A is not available, then processor 102 may wish to discard the request. In such an instance, there is no need for any coherency reporting to processor 102, since processor 102 does not intend to go further with the request, at this time.

However, if the status information returned to processor 162 is not "retried" by another bus device and the address has been acknowledged, then processor 102 may wait for a variable amount of time for the coherency information, which may be returned to processor 102 from the various other bus devices in system 100. This coherency information, which is produced as a result of a typical snooping operation by the other bus devices, indicates to processor 102 where the most recent version of the requested data is located. For example, if processor 104 determines that it contains the requested data in a modified form, then it will inform processor 102 that it holds the most recent version of the requested data and that system memory 112 does not contain the most recent version.

The first response window, which is the flow control and error status response window, is placed, in a preferred embodiment, two clock cycles from the cycle containing the request code and address. This should allow sufficient time for system controller 130 to check for valid parity and decode the request and/or address and decide if there are facilities in system 100 able to handle the request. If there is an error in the request, or the intended receiver cannot perform the request at that time, the first response window is utilized to indicate this fact. Table A indicates example status messages that may be returned to processor 102. Note that the table includes a prioritization of the returned status messages. This prioritization may be utilized by system controller 130, which first receives the first window, to determine which of the received messages from various bus devices to send to processor 102.

TABLE A

| Encoded Status Message | Priority | Definition |
| --- | --- | --- |
| 00 | 1 | Address Parity Error (AParErr) |
| 01 | 2 | Retry |
| 10 | 3 | Address Acknowledged |
| 11 | 4 | Null (not decoded, no parity error, no retry) |

Address Parity Error indicates bad parity was detected on the previous address or control information. A Retry response is used for flow control and for indicating that the requested resources may be busy. An Address Acknowledged response means that the operation has been decoded correctly and been accepted. A Null response indicates that the operation or address encoding was not received by one or more of the bus devices.

Figure 3:
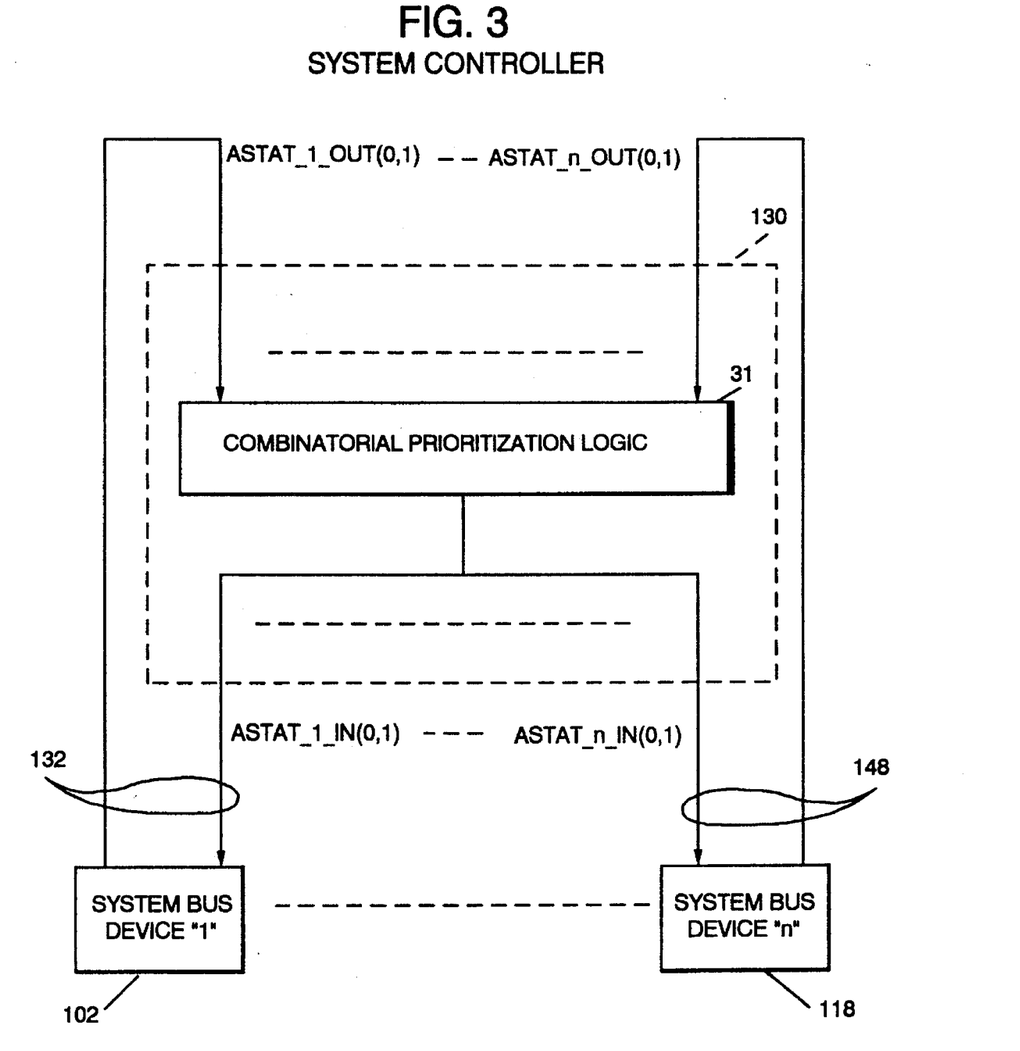
FIG. 3 illustrates a preferred embodiment of the system controller of the present invention.

Referring next to FIG. 3, there is illustrated implemented in accordance with the present invention, whereby status information is returned from bus devices 102–118 to combinatorial prioritization logic 31 within system controller 130. Logic 31 then determines which of the returned status messages to send to bus devices 102–118. For example, if bus device 102 returns a Retry message, having a priority of 2 (see Table A), and bus device 118 returns an Address Acknowledged message having a priority of 3, then logic 31 may be implemented to send the Retry message to bus devices 102–118.

Figure 4:
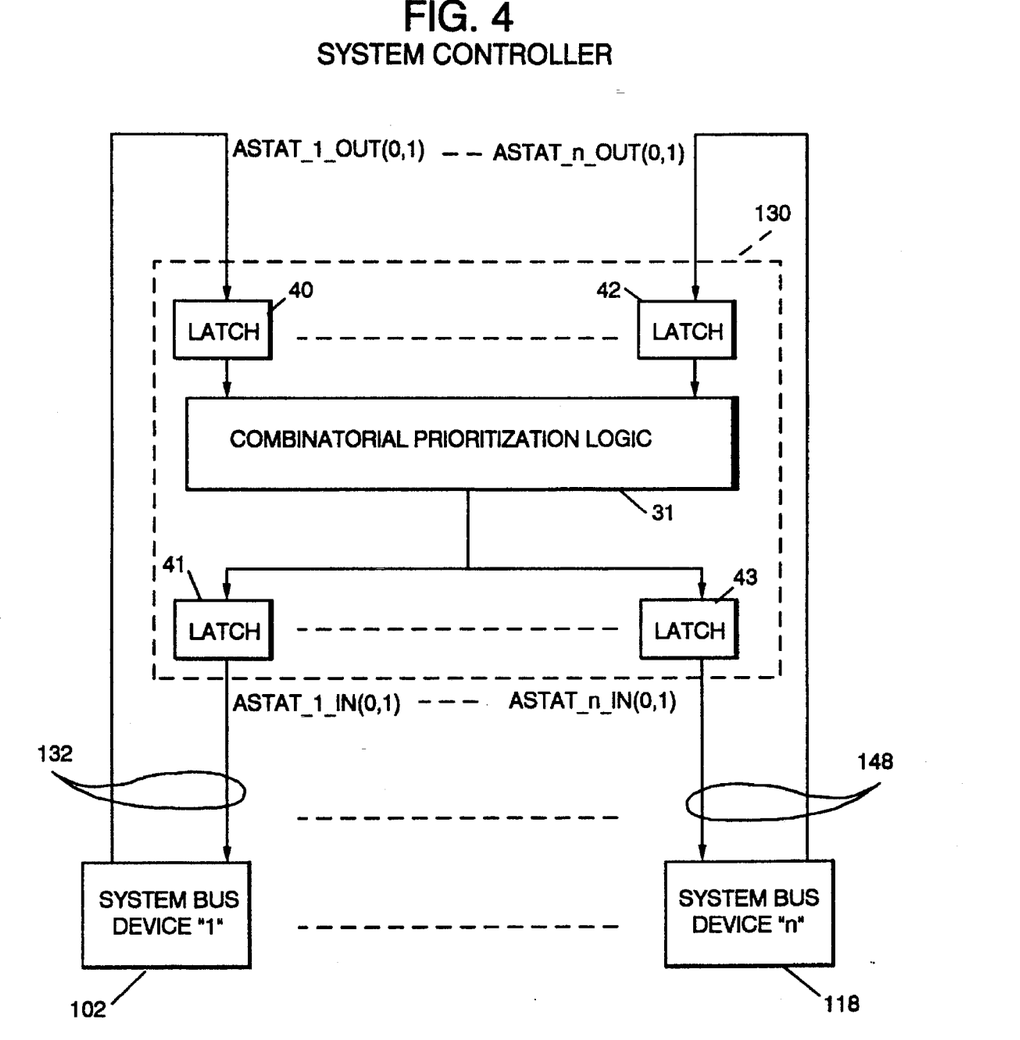
FIG. 4 illustrates a preferred embodiment of the system controller of the present invention.

Referring next to FIG. 4, there is illustrated system controller 130 as illustrated and discussed with respect to FIG. 3, except that latches 40–43 are implemented so that a latch-to-latch implementation of system controller 130 may be utilized.

The second response window (the snoop window) is utilized for coherency reporting. This window may be placed a configurable number of clock cycles after the address and request code to allow for different and longer access times to perform cache directory look ups within each of the various bus devices in system 100.

There are two main types of transactions implemented within system 100, those that must be snooped for memory reherency and those which do not need to be snooped. The separate windows allow for the non-coherent requests (such as I/O Loads and Stores) to complete on the bus as soon a possible without waiting for the coherency responses, which generally have a longer latency, due to the cache directory look-ups within the individual bus devices.

In order to maximize the number of bus attachments and bus frequency, and yet allow attachment to the bus directly with CMOS logic devices, the various status and coherency responses from the bus devices are driven uni-directionally from each bus participant to a common collection point, usually in system controller 130, which combines all the responses and then returns the combined responses to each requesting bus device. Additionally, the combining logic also prioritizes the responses, since bus devices may be signalling different responses. These prioritizations are noted within the tables described herein.

The values for the coherency response window are encoded and prioritized as shown below in a preferred embodiment.

TABLE B

| Encoded Snoop (Coherency) Message | Priority | Definition |
|---|---|---|
| 000 | | Reserved |
| 001 | Reserved | |
| 010 | Reserved | |
| 011 | 3 | Rerun |
| 100 | 1 | Retry |
| 101 | 2 | Modified |
| 110 | 4 | Shared |
| 111 | 5 | Null or Clean (Not Modified or Shared) |

In Table B, the Rerun response is used to extend the coherency response when leaving the local bus. The Retry response is used to indicate a coherency collision and that the operation should be resent later by the requesting device. The Modified response is used to indicate to the requesting device that a modified cache line exists in an enclosed cache within one of the bus devices. A Shared response indicates that the data exists in one or more caches, but is not modified.

Figure 5:
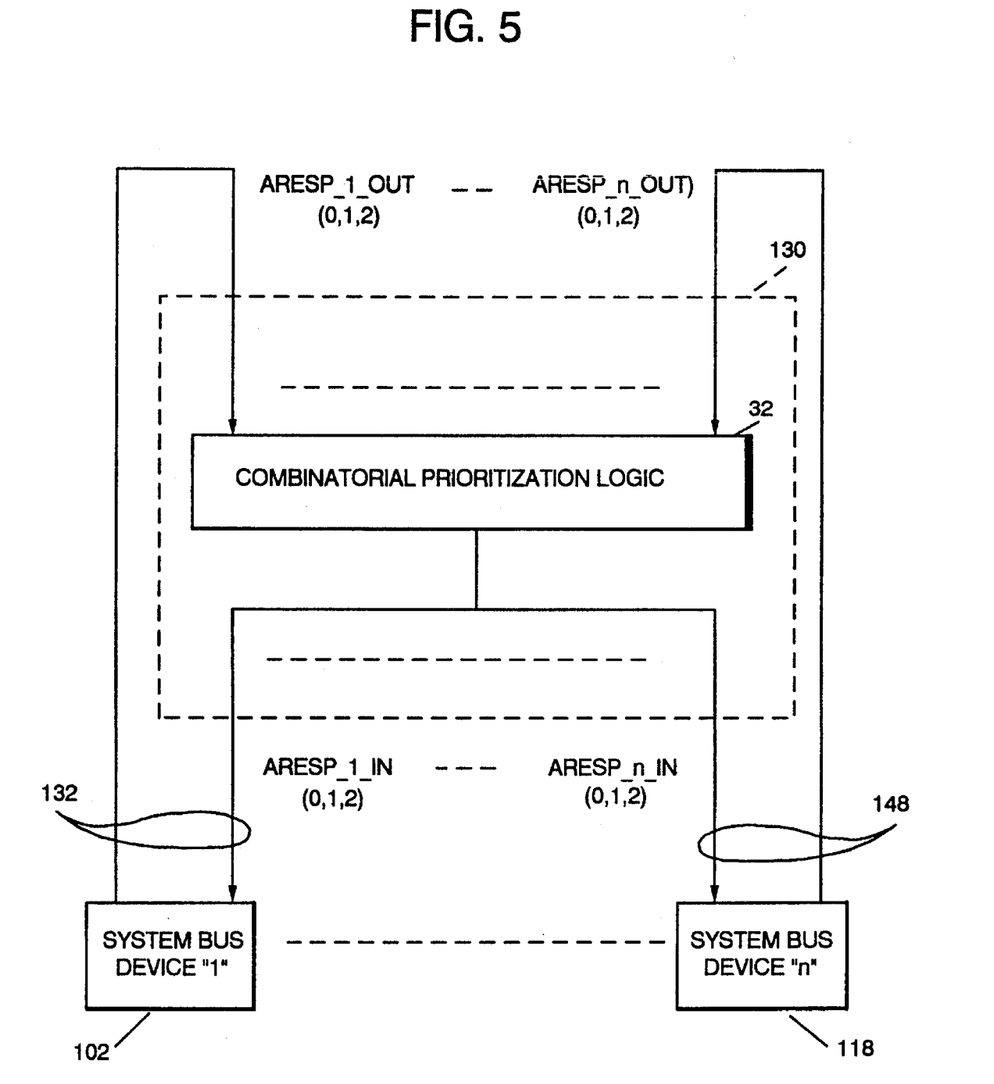
FIG. 5 illustrates a preferred embodiment of the system controller of the present invention.

Referring next to FIG. 5, there is illustrated system controller 130 as illustrated in FIGS. 3 and 4, for receiving and driving the address response windows. Logic 32 operates in a manner similar as described with respect to FIGS. 3 and 4 in that the priorities indicated in Table B are utilized within logic 32 to determine which of the returned coherency messages to send to bus devices 102–118.

Figure 7:
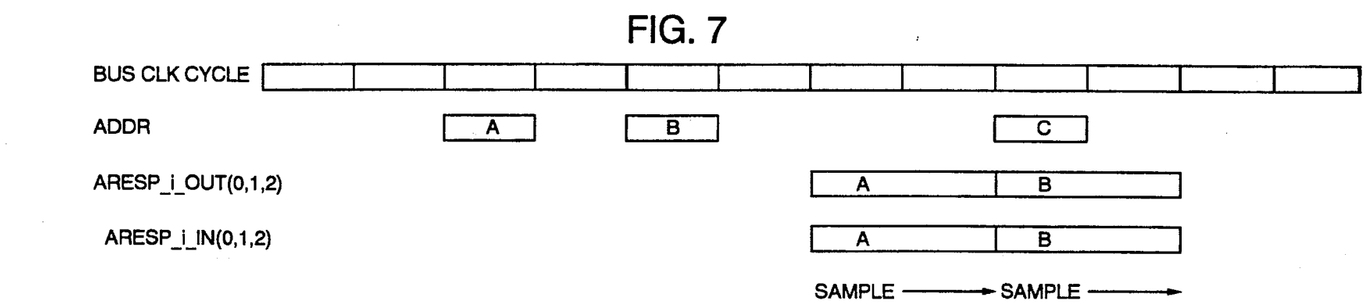
FIG. 7 illustrates a timing diagram in accordance with the present invention.

To allow for different system configurations, there are two sample periods for sampling the combined response that is driven back to the various bus devices. For smaller systems which can implement a combinatorial combiner/prioritizer, the responses are sampled by each of the bus devices on the second clock from being driven from system controller 130. The foregoing is illustrated with the timing diagram of FIG. 7.

Figure 6:
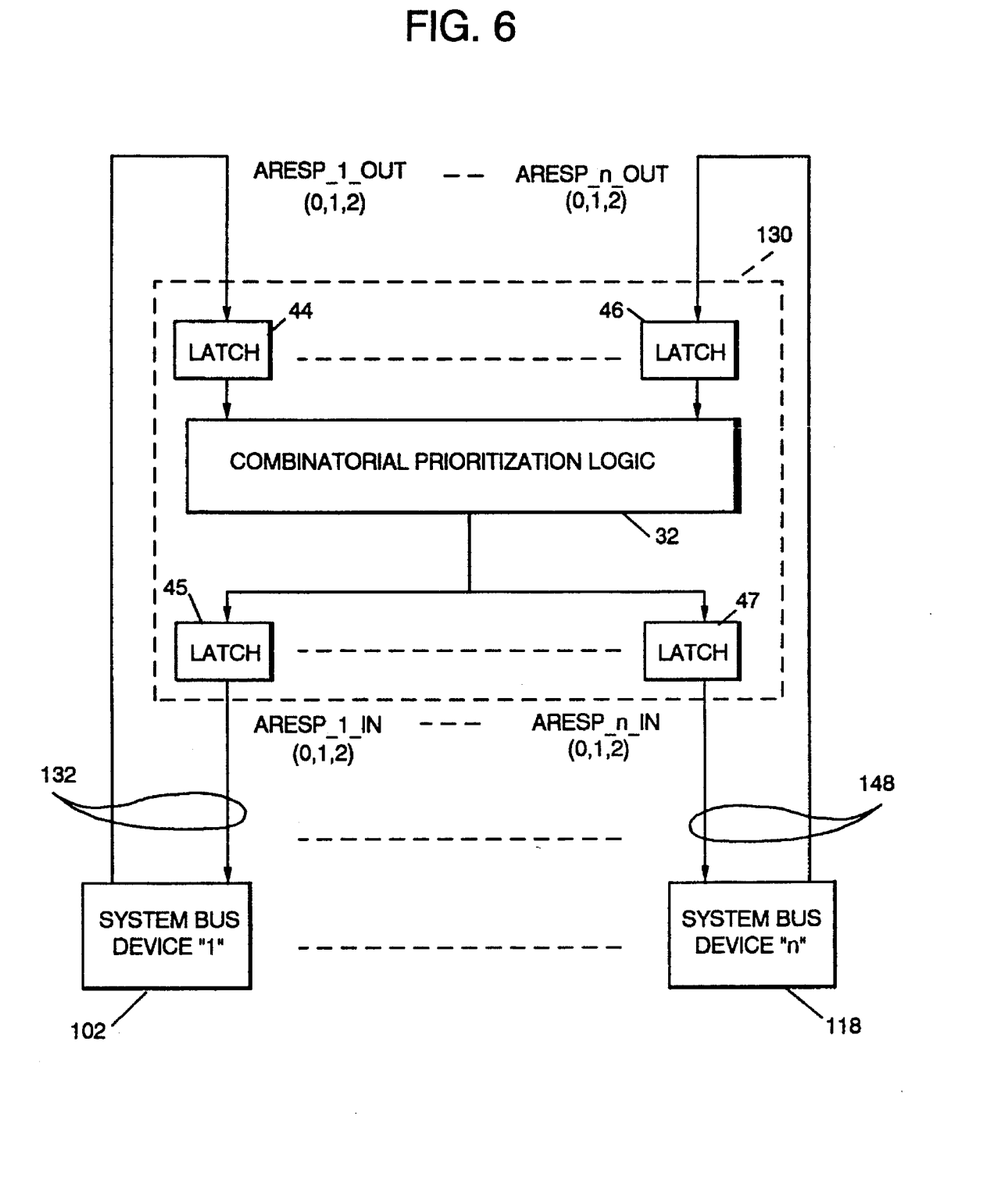
FIG. 6 illustrates a preferred embodiment of the system controller of the present invention.
Figure 8:
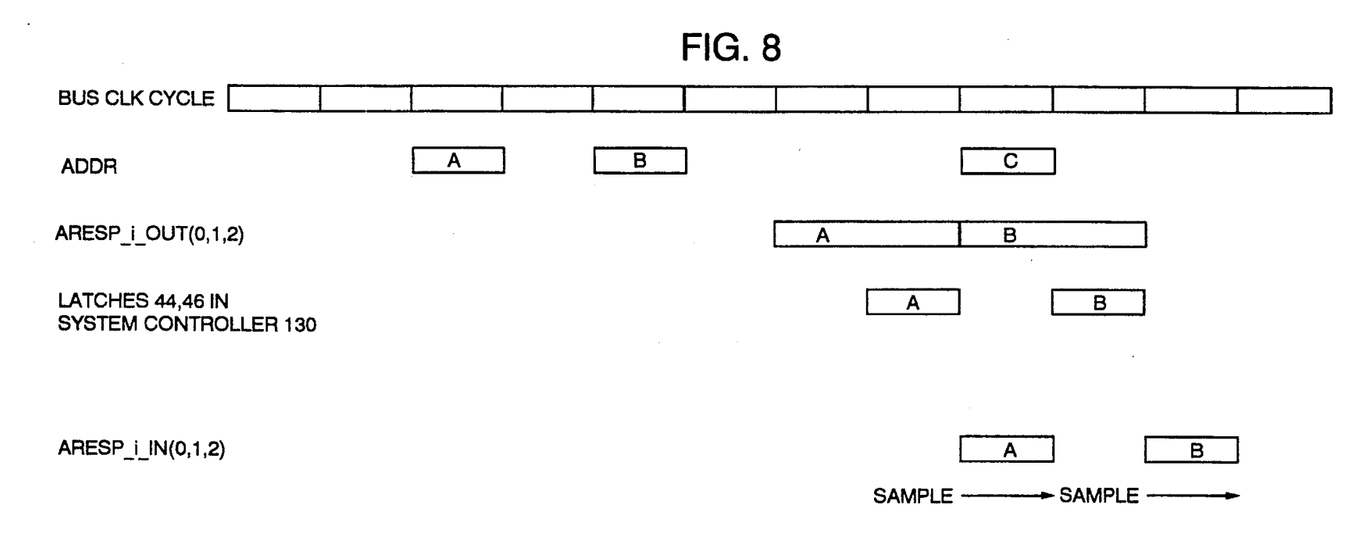
FIG. 8 illustrates a timing diagram in accordance with the present invention.

Referring next to FIG. 6, there is illustrated system controller 130 in a manner similar as illustrated in FIG. 5, except for that latches 44–47 are utilized to implement a latch-to-latch protocol. For larger systems, the response may be latched and then driven and therefore sampled one clock later. This latch-to-latch implementation is further illustrated by the timing diagram of FIG. 8.

Similarly, the status response may also be sampled one clock later as shown in FIG. 4 with the latch-to-latch implementation.

Although the present invention and its advantages have been described in detail, it should be understood that various changes, substitutions and alterations can be made herein without departing from the spirit and scope of the invention as defined by the appended claims.

What is claimed is:

1. A computer system, comprising:
   a plurality of bus devices including one or more processors;
   a storage device;
   a bus coupling said plurality of bus devices and said storage device;
   means for sending a bus request from one of said plurality of bus devices via said bus;
   first means for returning, via said bus to said one of said plurality of bus devices sending said bus request, an error or flow control signal in response to said bus request; and
   second means for returning, via said bus to said one of said plurality of bus devices sending said bus request, a coherency signal separate from said error or flow control signal in response to said bus request.

2. The computer system as recited in claim 1, wherein said error or flow control and coherency signals originate from one or more of said plurality of bus devices.

3. The computer system as recited in claim 1, wherein said bus request is snooped by said plurality of bus devices.

4. The computer system as recited in claim 1, wherein said first and second returning means further comprise:
   means for receiving said error or flow control and coherency signals from said one or more of said plurality of bus devices; and
   means for transferring said received error or flow control and coherency signals to said one of said plurality of bus devices sending said bus request.

5. The computer system as recited in claim 4, wherein said first and second returning means further comprise:

means for prioritizing said received error or flow control and coherency signals with other received signals before sending said signals to said plurality of bus devices.

6. The computer system as recited in claim 1, wherein said error or flow control signal is returned to said one of said plurality of bus devices sending said bus request a fixed number of bus cycles after said bus request has been sent by said one of said plurality of bus devices.

7. The computer system as recited in claim 6, wherein said coherency signal is returned to said one of said plurality of bus devices sending said bus request a programmable number of bus cycles after said error or flow control signal has been returned to said one of said plurality of bus devices sending said bus request.

8. In a multiprocessor system comprising a plurality of bus devices coupled to a storage device via a bus, wherein said plurality of bus devices have a snoop capability, a method comprising the steps of:

sending a bus request from one of said plurality of bus devices onto said bus;

returning, via said bus to said one of said plurality of bus devices sending said bus request, a error or flow control signal in response to said bus request; and returning, via said bus to said one of said plurality of bus devices sending said bus request, a coherency signal separate from said error or flow control signal in response to said bus request.

9. The method as recited in claim 8, wherein said error or flow control signal is returned a predetermined number of bus cycles after said bus request is sent by said one of said plurality of bus devices onto said bus.

10. The method as recited in claim 8, wherein said coherency signal is returned a variable number of bus cycles after said bus request is sent by said one of said plurality of bus devices onto said bus.

11. The method as recited in claim 8, further comprising the step of:

previous to said step of returning said error or flow control signal, encoding said error or flow control signal to indicate an address parity error.

12. The method as recited in claim 8, further comprising the step of:

previous to said step of returning said error or flow control signal, encoding said error or flow control signal as a retry signal.

13. The method as recited in claim 8, further comprising the step of:

previous to said step of returning said error or flow control signal, encoding said error or flow control signal to indicate an address acknowledgement.

14. The method as recited in claim 8, further comprising the step of:

previous to said step of returning said error or flow control signal, encoding said error or flow control signal to indicate a null.

15. The method as recited in claim 8, further comprising the step of:

previous to said step of returning said coherency signal, encoding said coherency signal to indicate a modified cache line exists in a cache within one of said plurality of bus devices returning said coherency signal.

16. The method as recited in claim 8, further comprising the step of:

previous to said step of returning said coherency signal, encoding said coherency signal to indicate an unmodified cache line exists in a cache within one of said plurality of bus devices returning said coherency signal.

17. The method as recited in claim 8, further comprising the step of:

previous to said step of returning said coherency signal, encoding said coherency signal to indicate a clean cache line.

18. The method as recited in claim 8, further comprising the steps of:

prioritizing said return of said error or flow control signal with other error or flow control signals; and prioritizing said return of said coherency signal with other coherency signals.

19. The method as recited in claim 8, wherein said returning steps further comprise the steps of:

receiving said error or flow control and coherency signals from one or more of said plurality of bus devices; and transferring said received error or flow control and coherency signals to said one of said plurality of bus devices sending said bus request.

20. In a multiprocessor system comprising a plurality of bus devices coupled to a memory controller that is coupled to a memory device, an input/output controller, and a system controller via a bus, wherein said plurality of bus devices have a snoop capability, a method comprising the steps of:

sending a bus request from one of said plurality of bus devices onto said bus, wherein said bus request is snooped by said plurality of bus devices, said memory controller and said input/output controller;

receiving, by said system controller, error or flow control and coherency signals from one or more of said plurality of bus devices, said memory controller and said input/output controller, wherein said error or flow control signal is returned a predetermined number of bus cycles after said bus request is sent by said one of said plurality of bus devices onto said bus, and wherein said coherency signal is returned a variable number of bus cycles after said bus request is sent by said one of said plurality of bus devices onto said bus; and transferring, by said system controller, said received error or flow control and coherency signals to said one of said plurality of bus devices sending said bus request, wherein said coherency signal is transferred to said one of said plurality of bus devices sending said bus request after said error or flow control signal is transferred to said one of said plurality of bus devices sending said bus request.

\* \* \* \* \*